United States Patent
Rowland-Hill

[15] 3,664,100
[45] May 23, 1972

[54] AXIAL COMBINE WITH ROTOR AND CONCAVE CONVERTIBLE TO SUPPORT DIFFERENT THRESHING ELEMENTS

[72] Inventor: Edward William Rowland-Hill, Lancaster, Pa.
[73] Assignee: Sperry Rand Corporation, New Holland, Pa.
[22] Filed: June 30, 1970
[21] Appl. No.: 51,304

[52] U.S. Cl. ...................................56/14.6, 56/2, 130/27 H, 130/27 HA, 130/27 K, 130/27 N, 130/27 T
[51] Int. Cl. ......................................................A01d 41/02
[58] Field of Search.....................56/2, 14.6, 16.5; 130/27 H, 130/27 HF, 27 HA, 27 K, 27 L, 27 N, 27 T, 27 J

[56] References Cited

UNITED STATES PATENTS

| | | | |
|---|---|---|---|
| 3,481,343 | 12/1969 | Van Buskirk | 130/27 T |
| 320,700 | 6/1885 | Roberts | 130/27 J |
| 3,491,523 | 1/1970 | Bornzin | 56/2 |
| 666,654 | 1/1901 | Dingee | 130/27 J |
| 1,066,024 | 7/1913 | Leavell | 130/27 N |
| 283,529 | 8/1883 | Stewart | 130/27 N |

Primary Examiner—Louis G. Mancene
Assistant Examiner—J. A. Oliff
Attorney—Joseph A. Brown, John C. Thompson, James J. Kennedy and George C. Bower

[57] ABSTRACT

The threshing and separating sections of an axial flow combine have the rotors and concaves in front and rear parts with the rear parts readily convertible to either spike threshing or rasp and concave-bar threshing.

10 Claims, 11 Drawing Figures

PATENTED MAY 23 1972 3,664,100
SHEET 1 OF 2
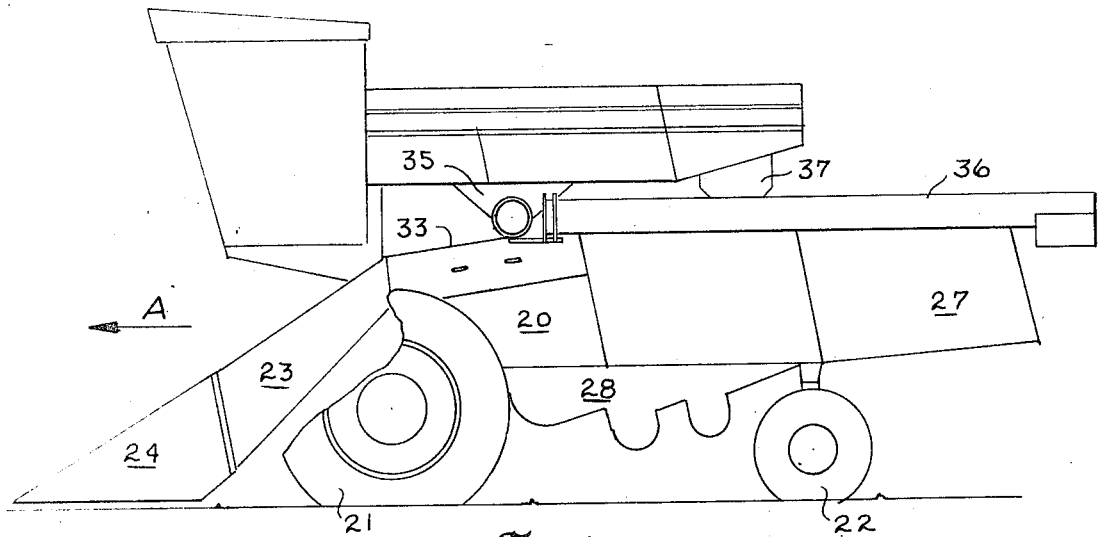
Fig 1
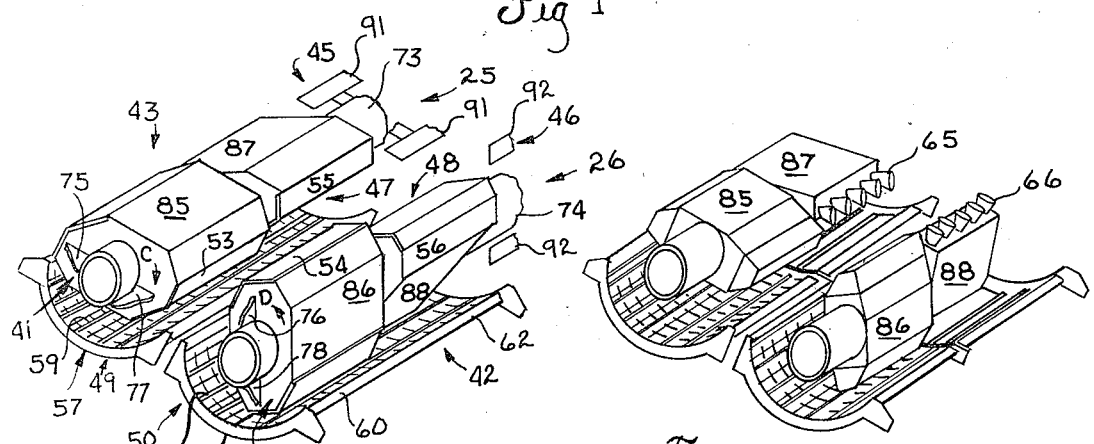
Fig 2
Fig 3
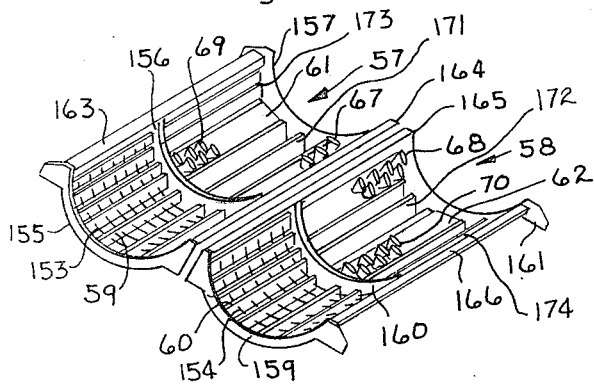
Fig 4
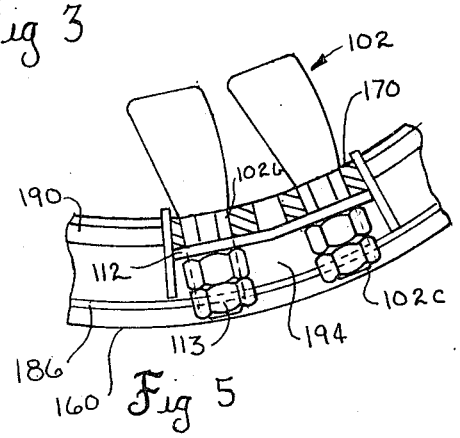
Fig 5
INVENTOR
EDWARD WILLIAM ROLAND-HILL
BY George C. Bower
ATTORNEY

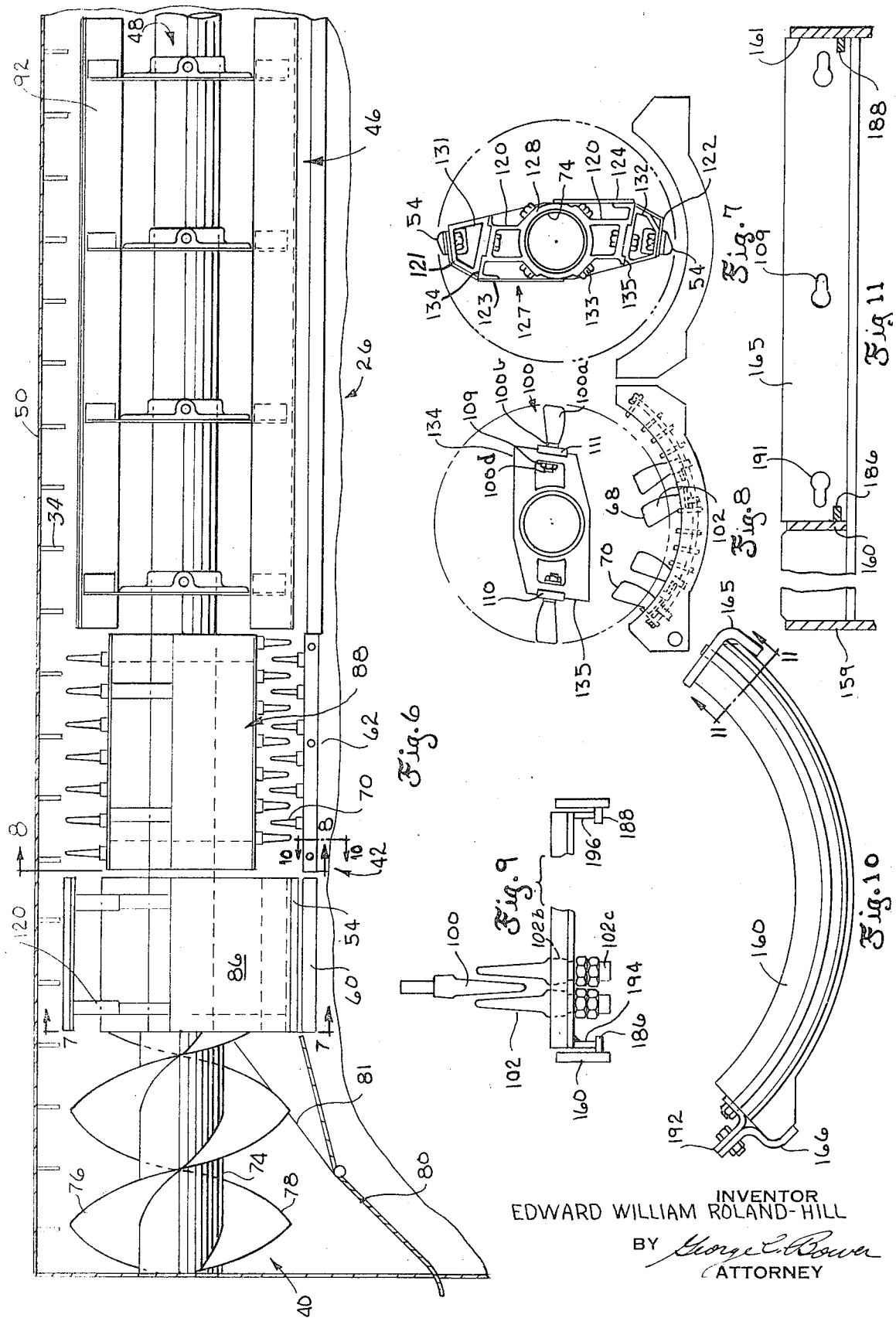

AXIAL COMBINE WITH ROTOR AND CONCAVE CONVERTIBLE TO SUPPORT DIFFERENT THRESHING ELEMENTS

BACKGROUND OF THE INVENTION

This invention relates to axial flow combines and is direct particularly to the convertibility of the threshing and separating sections for different types of threshing actions.

In the present commercially available combines, the threshing cylinders and concaves are transverse to the line of travel of the combine and flow of the crop material therethrough. The crop elevator on the front of the combine usually feeds directly into the threshing and separating means. In order to change the threshing elements of the combines, the crop elevator must be removed. Even though the crop elevator is of the detachable type, it is a time consuming and cumbersome operation to detach and reattach. It may take several hours to remove the crop elevator, change the threshing elements on the cylinder and concave, and reattach the crop elevator to the combine. The crop elevator is designed to remain attached to the combine. Special consideration is required to support the crop elevator separate from the combine. The weight and shape of the crop elevator present difficulties in supporting the elevator in the field. The conversion of the threshing elements in the conventional transverse combine is sparingly done. Usually the combine is set up for a crop or a group of crops and operated to thresh that particular crop or crops.

In the axial type combines the threshing and separating units extend axially and the crop material is fed into the ends of the threshing and separating section in a direction longitudinal to the rotor and concave bars. The rotors then sweep the crop material across the concave for threshing and separating the grain from the crop material. The longitudinal sides of the concaves and rotors are readily available from the sides of the combine by having covered openings on the combine housing adjacent to the threshing and separating means by having removable segments of the casings above the concaves. The rotor and the concave may be exposed by detaching the cover and segment. Thus the concaves and rotors are readily available for adjustment, repair and modification. In axial combines, this availability has not been utilized to modify the threshing concaves and rotors except for changing the spacing of the concave wires which extend circumferentially through the concave bars. The rotors and concaves have not been made for easy conversion from one type of threshing action to another.

It is the purpose of this invention to provide rotors and concaves that may be readily modified to support the different types of threshing elements for different types of threshing actions with a minimum of parts and connections.

OBJECTS AND SUMMARY OF THE INVENTION

An object of this invention is to provide an axial flow type combine with a concave and rotor that is readily convertible to different types of threshing actions.

Another object of this invention is to provide concaves and rotors of an axial flow type combine that are readily modified for either rasp bar and concave bar threshing or for spike threshing.

Another object of this invention is to firmly and removable attach concave bars, concave grate sections, and spikes to a concave.

Another object of the invention is to provide an axial flow type combine with a threshing rotor that may be readily modified through a longitudinal opening in the side of the casing for different types of threshing actions with a respective concave.

Another object of the invention is to provide an axial flow type combine with a concave that may be radily modified through a longitudinal opening in the side of the casing.

In summary, an axial flow type combine has a threshing and separating section with a concave and rotor that may be readily modified from the side of the casing to support different threshing elements for different types of threshing actions.

These and other objects and advantages of this invention will be apparent from the following description and claims taken in conjunction with the accompanying drawings which illustrate the various features of this invention.

BRIEF DESCRIPTION OF THE DRAWINGS

FIG. 1 is a side view of a combine with axial type threshing and separating units.

FIG. 2 is a fragmentary perspective view of the threshing and separating sections with concave bars and rasp bars.

FIG. 3 is a fragmentary perspective view of the threshing and separating sections having spikes.

FIG. 4 is a perspective view of the concaves of the embodiment of FIG. 3.

FIG. 5 is a fragmentary foward view of the concave of FIG. 4 to illustrate the mounting of the spikes in the concave.

FIG. 6 is a side view of the left threshing and separating unit.

FIG. 7 is an end view of the front part of the threshing rotor taken along lines 7—7 of FIG. 6.

FIG. 8 is a sectional view of the left threshing and separating unit taken along lines 8—8 of FIG. 6 and illustrating the rear part of the threshing rotor and concave with spikes.

FIG. 9 is a fragmentary longitudinal sectional view of the rear parts of the rotor and concave illustrating the threshing relationship between spikes of the rotor and spikes on the concave.

FIG. 10 is a sectional view of the left concave taken along lines 10—10 of FIG. 6 illustrating the intermediate member viewed in the direction of travel.

FIG. 11 is a longitudinal sectional view taken along lines 11—11 of FIG. 10 to illustrate the inner longitudinally extending support beam of the rear part of the concave.

DETAILED DESCRIPTION OF THE PREFERRED EMBODIMENT

Introduction

In the following description of the combine, the various parts of the combine are referred to as being left or right on viewing the combine in the direction of travel A. The direction of travel is opposite to the direction of movement of the crop material through the combine.

In FIG. 1 the left side of the combine is shown with the various drives omitted. The combine comprises a main housing or frame 20 mounted on two forward drive wheels 21 and two rear steering wheels 22. The crop elevator 23 and header 24 are mounted on the front of the main housing 20 to harvest the crop and feed it to the right and left threshing and separating units 25, 26 mounted in the main housing 20. The units thresh and separate the grain from the crop material and discharge the grainless crop material from the rear of the combine through a large bottom opening in the hood 27. Grain cleaning means are provided within the main housing for separating chaff and debris from the grain. A casing 28 extends below the main frame for housing the blower and the grain and tailing collecting means. On top of the combine is an engine 37 and a grain tank 35 with a hinged unloading auger 36. An operator's cab 38 is mounted on the front of the housing 20 above the crop elevator 23.

The right and left threshing and separating units 25, 26 are in side by side relation and are fragmentarily illustrated in FIG. 2. The forward feed sections 41, 40, intermediate threshing and separating sections 43, 42 and separating sections 45, 46 are formed by rotors 47, 48 and casings 49, 50. The left threshing and separating unit is shown in detail in FIG. 6. The right threshing and separating unit is identical to the left threshing and separating unit except for adaptation to rotating in the opposite direction.

A particular feature of these threshing and separating units is the convertibility and accessibility of the threshing and separating sections. Since the threshing and separating units extend longitudinally through the main housing 20 the sides of the threshing and separating sections are parallel to the sides of the housing and the right threshing separating section is available through the right side of the combine and the left threshing and separating section is accessible through the left side of the combine. As illustrated in FIG. 1, a door 33 is removable from the left side of the combine so that when it is removed, the left side of the casing is exposed. The casings of the threshing and separating sections have these outer sides removable so that the concaves and threshing rotors are available for inspection, adjustment, repairs and for conversion and rearrangement of the threshing elements when desirable. The circumferential wires of the concaves are also accessible for rearrangement to set the concaves with different separating openings.

In FIG. 2 the threshing and separating sections have rasp bars 53, 55 on the right rotor and rasp bars 54, 56 on the left rotor and longitudinally extending concave parts 59, 61 and 60, 62 on the right and left concaves. In the embodiment shown in FIG. 3 the rasp bars 55 and 56 have been replaced by spike sections 65 and 66 and the concaves 57, 58 have been modified to have spike sections 67, 69 and 68, 70, respectively. These modifications are made for the best threshing action depending upon the crop being harvested by the combines.

Threshing and Separating Units

The right and left threshing and separating units have the rotors 47 and 48 rotating in opposite directions C and D so that the threshing elements are moving downwardly and entering into the initial threshing action with the respective concaves 57 and 58 of the casings 49 and 50, respectively, at the center of the combine. Considering the right and left threshing and separating units in conjunction with the detailed side view of the left threshing unit shown in FIG. 6 the threshing units have feed sections 40, 41 with the right section having the auger flights 75, 77 on the tubular shaft 73 and the left section having flights 76, 78 on the tubular shaft 74. The crop material is carried up from the header 24 by the crop elevator 23 to a ramp means 80 which carries the crop material up into the flights of the two feed sections 40, 41. The ramp means extends the width of the combine frame 20 underneath the two feed sections. The crop divider 81 equally divides the crop for introduction into the threshing and separating sections by the respective flights.

The rotors of the threshing and separating sections have front threshing parts 85, 86 and rear parts 87, 88 respectively. The rear parts of the threshing rotors are circumferentially offset approximately 45° from the front part in a trailing relation to the forward part. The following or rear rotor parts are in trailing relation to the preceeding rotor parts. The rotors enter into the initial threshing relation with the respective concaves at different times for a smoother and more distributed threshing load on the driving elements of the combine. As best seen in FIG. 2 and 3, in addition to the rotor parts being offset the two threshing rotors are 90° out of phase. Thus the threshing action of the two rotors are 90° out of phase. The concaves are in threshing relations with the threshing elements of a respective part over a 90° circumferential arc. For example, in FIG. 2 as the threshing element 53 enters into threshing relation with a concave 57, the threshing element 56 on the other rotor would be approximately midway of the concave 58. When the threshing element 53 is at the midpoint of concave 57, the threshing element 55 on the same rotor will be entering into threshing relation with the concave 57 and the threshing element 56 on the other rotor will be just leaving the threshing action with the concave 58. As the threshing element 53 is leaving the concave 57, threshing element 55 is at the mid position and the threshing element 54 is just commencing the threshing action with the concave 58.

On feeding of the crop material by the feed sections 40, 41 to the front rotor parts, the crop material if formed into a mat and carried circumferentially around the casings by the rotors. As illustrated in FIG. 6, the threshing and separating units have transport fins 34 on the top walls to move the mat of crop material rearwardly through a multiplicity of threshing actions by the rotor parts. The mats of crop material are thoroughly threshed and passed to the separating sections of the units.

The left section is illustrated in detail in FIG. 6. The separating sections 45, 46 have paddles 91, 92 mounted on rotors 47, 48 to sweep the crop material across the grate for separating the grain held within the straw mats. The straw mats are then discharged from the rear of the threshing and separating units and out of the combine.

Threshing Elements

The crop material is carried around the casing and across the concave by the rotors. The rotors move across the concave at a higher speed than the mat of crop material so that the crop material is squeezed and drawn across the concaves to rub the grain from the stems or ears of corn. In FIG. 2 as previously described the rotors have rasp bars 53, 55 and 54, 56 and the concaves 57 and 58 have front concave bar parts 59 and 60 and rear concave parts 61, 62. The rasp bars have raised portions or rasps at an angle to the axis of the rotor and to the concave bars. The rasp bars extend the length of the respective parts on which they are mounted. The concave bars extend longitudinally as shown in FIG. 2 and have a rectangular configuration with rectangular edges. The edges extend above the concave for cooperating with the rasp bars in the threshing action. Circumferentially extending wires or rods divide the longitudinal spaces between the concave bars and the rectangular openings. The size of the openings can be changed by the distance between the wires. The size of the openings depends on the type of crop being threshed.

The spike sections 65, 66 and 67, 69, 68, 70 are mounted, respectively, on the rotors and on the concaves. The spikes on these sections are of a substantially different type of structure from the rasp bars and concave bars and have a different type of threshing action. Referring to FIGS. 5 and 8 illustrating the rotor 48, the spikes 100 have flat blades 100a. The blades are conventional in shape, being narrow in thickness and wide in the direction of movement of the rotor so that the blade side surfaces on the rotor spikes 100 are parallel to the blade side surfaces on the concave spikes 102. The mounting portion has a tapered hexagonal portion 100b and a threaded cylindrical portion 100d for the nuts 109 fastening the rotor blades to the mounting plates 110, 111. Similarly the spikes 102 have cylindrical portions 102c extending through the plate 112 and fastened thereto a nut 113 as illustrated in FIG. 5. The blade of the rotor spikes and the blade of the concave spikes overlap and the rotor blade draws the crop material between the concave blades to produce a rubbing and threshing action along the blade side surface to remove the grain from the crop material.

Threshing Rotor

As previously described the threshing rotors have front parts 85 and 86 and rear parts 87 and 88, respectively. The axial length of the front parts is shorter than the rear parts and in the embodiment described herein the front parts have an axial length approximately two thirds of the axial length of the rear part.

The threshing rotors of the left and right threshing and separating units 26 and 25 are the same. The detailed construction of the rotors will be considered in connection with the left threshing rotor as shown in FIG. 6 through 9. The front part of the left threshing rotor has two radially extending arms 120, longitudinally extending L-shaped supports 121 and 122 mounted on the outer ends of the arms, side plates 123, 124 and rasp bars 54. The arms 120 comprise center pieces 127 having a collar 128 fitting on the tubular shaft 74 with detachably mounted tip pieces 131 and 132. The collar 128 is securely fastened to the tubular member 74 by the bolts 133 to fix the arms circumferentially and axially on the tubular member. The center pieces 127 have end surfaces 134 and 135 with axially extending grooves. The tip pieces 131 and 132 have matching surfaces with keys fitting in the matching grooves. The surfaces 134, 135 are sloped away from or at an angle to a plane tangential to the rotation of the rotor. The L-shaped supports 121 and 122 and the longitudinally extending rasp bars 54 are attached to the tip pieces 131 and 132. The L-shaped supports have portions facing the direction of rotation. The crop material engages these surfaces.

The rear parts of the rotor also have two sets of arms 120, which are further apart than the arms of the front part. If these rear parts are set for rasp bar threshing the arms would have the detachable tip pieces 131 and 132 mounted thereon and would be similar in construction to the end view of the rotor shown in FIG. 7. For spike threshing, as shown in FIG. 6 and 8, the rear part has spikes 100.

The arms 120 are securely fastened to the tubular shaft 74 and have longitudinal axial extending bars 110, 111 fastened to the ends of the center pieces by the spikes 100. The bar fits in the axial grooves for firm holding of the bars on the ends of the center pieces of the arms. The rectangular shaped bar 110 has hexagonal openings and the tapered hexagonal portions 100b of the spikes fitting in these openings and the threaded cylindrical portions 100c extending through the bar for fastening of the spikes to the rotor. Side plates 123 and 124 (FIG. 7) are mounted on the arms center pieces. The side plates 123 and 124 shield the arms and extend from the spikes to the other side of the tubular shaft and form a leading surface or surfaces of the rotor engaging the crop material.

Concaves

In FIG. 2, the concaves 57 and 58 have the front concave parts 59 and 60 extending a portion of the length of the concaves and the rear parts 61, 62 over the remainder. The wires 153 and 154 may be, preferably, more closely spaced over the length of the front parts than over the rear parts. These spacings, however, may be changed depending upon the crops being threshed and the condition of the threshed crops.

The particular feature is that the rear concave parts 61, 62, as shown in FIG. 4, are convertible or adaptable to have spikes or concave bars. The concaves 57, 58 have three circular curved transverse members 155, 156, 157 and 159, 160, 161 respectively, and longitudinally extending beams 163, 164 and 165, 166 respectively extending along opposite edges of the concave with the beams 164 and 165 being inner beams and beams 163 and 166 being outer beams accessible from the respective sides of the combine. The front parts 59, 60 have fixed concave bars and cooperating with the front parts 85 and 86 of the threshing rotor. The concave bars are welded to the transverse members 155, 156 and 159, 160, respectively. These front concave parts are fixed to the concave frame and are not removable therefrom. The closely spaced wires 153 and 154 extend circumferentially through the respective bars and are insertable and removable from the outer edges of the concave. The rear parts 61, 62 of the concave, however, may have, as in FIG. 2, three sets of concaves bars, respectively, which are removably mounted on the transverse members 156, 157, and 160, 161, respectively, or the spike form have two spike sections 67, 69 and 68, 70, respectively, and concave grate sections 171, 173, 172, 174.

The concave grate sections 171, 173, 172 and 174 comprise, respectively, three longitudinally extending concave bars held together by transverse end members. The spiked sections 67, 69, 68 and 70 each comprise plates 112 having two rows of openings alternately spaced for attaching the spikes 102 by the cylindrical portion 102c extending through the holes and fastened thereto by nuts 113, as shown in FIG. 5. As previously described in connection with the rotors, the spikes have tapered hexagonal portions 102b. These portions fit into longitudinally extending bars 170 having tapered hexagonal openings for keying the blades of the spikes so that the long dimension of the width extends in the direction of the rotation of the rotor spikes.

The transverse members 156 and 157, 160 and 161 have circular flanges adjacent the bottom edge thereof and extending inwardly into the rear parts of the concaves or project axially towards one another for supporting the concave bar and spiked sections. The flanges 186 and 188 of the left threshing and separating section are shown in FIG. 6 and greater detail in FIG. 9, 10, and 11. The second parts of the two concaves are the same and detailed structure will be considered in connection with the left threshing and separating section. The end members of the concave grate sections 172 and 174 rest on the flanges 186 and 188 and are held by circular curved fastening rods 190 extending through openings in the concave bars and secured to the inner beams by having a flanged head fitting into a key hole type slot. The outer ends of the rods are fastened to a L-shaped bracket 192 mounted on the outer beam 166. With no spiked sections mounted on the flanges the rods 190 are fitted into the key hole slots 191. The concave grate sections and the spiked sections are fitted from the side of the combine onto the flanges 186 and 188 and are held by the bars 190. When the sections are in position the bracket 192 is mounted on the beam 166 and the rods are fastened to the bracket 192. The concave plates 112 have curved strips 194 and 196 resting on the flanges 186, 188. The adjacent bar of the concave sections extend radially and the plates 112 are edged between these bars to hold these plates into position. The curved rods 190 pass above the spike plates 112 thus with the tying of the rods 190 to the bracket 192 the concave sections and spike section are firmly held in position.

As shown in FIG. 3 and 6, seven spiked teeth extend in a row along the rear part of the rotor. In FIG. 4, the rear parts of the concaves with the spike sections 67 and 69 and 68 and 70 illustrate the sections extending axially half the rear part of the concave and alternately positioned. However under certain conditions it may be desirable to extend the spike 102 of the sections 67 and 69 and 68 and 70 over the full length of the respective spike sections and plates.

Operation

Threshing and separating units have both the front and rear parts of the threshing and separating rotor with rasp bars and concave bars, when corn, maize or the grain crops such as wheat, barley, oats are harvested and threshed by the combine. The forms of threshing and separating section with spikes as shown in FIG. 3, 4 and 6 are used in threshing rice, tough grasses, or where the crop material may be long and green. Rice is conventionally threshed with spiked rotor and concave. In tough grasses or grain crops with weeds, the rasp bar and concave bar form of the threshing and separating section, occasionally, has the problem of the green crop material forming into a rope which makes proper threshing and separating of the grain very difficult. Under these circumstances it is desirable to provide the rear parts of the concave and rotor with spikes to break up this roping condition.

In the form of the rotor and concave with spikes the crop material is drawn through and between the spikes so that the crop material is flailed and rubbed against the surfaces of the spikes. The concave sections 61, 62 and 71, 72 function primarily as grates to pass the separated grain or rice through the concave onto the grain pan.

As previously described, the rotors move downwardly at the inner sides or edges of the concaves as indicated by the arrows C and D in FIGS. 2 and 3. In the spike form the crop material is drawn through the spike sections 67, 68, then the more forwardly cropped material is drawn through the spikes sections 69, 70. Thus the spikes on the rotor alternately pass through the spiked sections on the respective concaves. This distributes the threshing load and smooths the threshing action of the rotors.

Summary of Features and Advantages

The main advantage of the foregoing threshing and separating section is the ease of convertibility of the threshing rotors and the concaves to adapt the threshing and separating units for handling different types of crops and crop conditions. The rotors and concaves may be adapted to a purely rasp bar and concave bar combination for threshing grains, corns, and other crops or adapted to a combination of the threshing and separating spike and bar threshing. Both of these changes are readily made from the side of the combine and threshing and separating units without having to remove any large components of the combine. An easily detachable cover is removed from the side of the housing of the combine and a side portion of the wall of the casing of the threshing and separating unit may be easily detached to expose the inner concave and rotor. The edges of the rotor are readily presented to the opening in the side of the casing for changing the threshing elements. The concave grate sections and spike sections easily slide transversely onto the rear part of the concaves and, similarly, the concave bars for a rasp bar and concave bar threshing action are also easily slided into position transversely from the side of the combine and casing. Thus, a custom operator or farmer may change the nature of the combine in a short time and with the minimum amount of attaching and detaching of the elements in the rotor and concaves. This quick adaptability of the combine to different crops and crop conditions permits the combine to handle nearly all types of crops and crop conditions that may occur.

The performance of the new combine in its various modified forms are comparable to a corresponding size combine and in most instances is superior in threshing capacity. Therefore there is no loss in the operation of the combine to attain this flexibility. Actually the combine performs in a superior manner in most crops to a corresponding type of conventional combine.

Another feature of this combine is that the front and rear parts of the threshing and separating sections provide a combination of rasp bar and concave bar threshing and spiked threshing. Thus the benefit or advantages of both of these types of threshing may be attained in a single machine. In the present transverse combines the concaves and cylinders have to be set for one or the other. In addition the rasp bars may be removed from the front parts and a purely spike threshing is available, further adding to the flexibility and versatility of the combine made in accordance with this invention.

While the invention has been described, it will be understood that it is capable of further modifications and this specification is intended to cover any variations, uses, or adaptations of the invention following in general, the principles of the invention and include such departures from the present disclosure as, within known or customary practice in the art to which the invention pertains, and as may be applied to the essential features here and before set forth as full in the scope of the invention or the limits of the intended claims.

Having thus described my invention, what I claim is:

1. A mobile axial flow type threshing and separating unit comprising:
   a casing having a concave portion with means for threshing crop,
   a rotor having a threshing portion with means for threshing crop,
   said rotor being rotatably mounted in said casing and cooperating with said casing to pass crop material therethrough on rotation of said rotor and to pass crop material between said threshing means of said concave portion and said threshing portion for the threshing and separation of grain from crop material,
   said concave portion and said threshing portion comprising front parts and rear parts,
   said threshing means of said front part of said concave portion having concave bars and said threshing means of said front part of said threshing portion being rasp bars in rotative threshing relation with said concave bars,
   said threshing means of said rear part of said concave portion including spike structure and
   said rear part of said rotor has mounting means for detachably supporting tip structure with rasp bars and said threshing means of said rear part of said threshing portion includes bar-like structure detachably secured to said mounting means and having spikes in threshing relation with said concave spike structure.

2. A mobile axial flow type threshing and separating unit as set forth in claim 1 wherein said casing has a side opening above said concave for access to change said threshing means on said rotor and concave and having a wall portion closing said opening for operation of the unit.

3. A mobile axial flow type threshing and separating unit comprising:
   a casing having a concave portion with means for threshing crop,
   a rotor having a threshing portion with means for threshing crop, said rotor being rotatably mounted in said casing and on rotation cooperating with said casing to pass crop material therethrough and between said threshing means of said concave portion and said threshing portion for the threshing and separation of grain from the crop material,
   said concave portion and said threshing portion comprising front parts and rear parts,
   said threshing means of said front part of said concave portion being concave bars and said threshing means of said front part of said threshing portion being rasp bars in rotative threshing relation with said concave bars,
   said threshing means of said rear part of said concave portion being spike structure and said threshing means of said rear part of said threshing portion being spikes in rotative threshing relation with said concave spike structure, and
   said rear part of said concave portion having mounting means for detachably supporting concave grate sections and plate-like means, said threshing means of said rear part of said concave portion includes plate-like structure detachably mounted on said mounting means and having spikes in threshing relation with said spikes of said threshing portion.

4. A mobile axial flow type threshing and separating unit as set forth in claim 3 wherein said casing has a side opening above said concave portion for access to change said threshing means of said concave portion and has a wall portion closing said opening for operation of the unit.

5. A mobile axial flow type threshing and separating unit as set forth in claim 3 wherein said rear part of said concave portion has two longitudinally spaced transverse members and two longitudinally extending beams extending therebetween and attached thereto.

6. A mobile axial flow type threshing and separating unit as set forth in claim 5 wherein said mounting means include curved transversely extending rods attached to said beams and extending circumferentially to hold said threshing means in place.

7. A mobile axial flow type threshing and separating unit as set forth in claim 6 wherein said transverse members have circumferentially extending flanges axially projecting towards one another and said beams have circumferentially extending rods attached thereto and said plate-like means set on said flanges and are held in place by said curved rods.

8. A mobile axial flow type threshing and separating unit as set forth in claim 3 wherein said concave portion of said rear part has axially extending grate sections as well as said concave plate-like structure.

9. A mobile axial flow type threshing and separating unit as set forth in claim 8 wherein said grate sections have generally radially extending sides and said plate-like structure is held in position by said radially extending sides.

10. A mobile axial flow type threshing and separating unit comprising a casing having a concave portion with means for threshing crops,
    a rotor having a threshing portion with means for threshing crops,
    said rotor being rotatably mounted in said casing and on rotation cooperating with said casing to pass crop material therethrough and to pass crop material between said threshing means of said concave portion and said threshing portion for the threshing and separating of grain from crop material,
    said concave portion and said threshing portion comprising front parts and rear parts,
    said threshing means of said front part of said concave portion being concave bars and said threshing means of said front part of said threshing portion being rasp bars in rotative threshing relation with said concave bars,
    said threshing means of said rear part of said concave portion including spike structure and said threshing means of said rear part of said threshing portion being spike structure in rotative relation with said concave spike structure means,
said rear part of said rotor has mounting means for detachably supporting tip structure with rasp bars and said rotor threshing means including bar-like structure detachably mounted on said rotor mounting means and having spikes,
said rear part of said concave portion has mounting means for detachably supporting concave grate sections and plate-like structure, said concave threshing means including plate-like structure detachably mounted on said mounting means and having spikes in threshing relation with said rotor spikes on rotation of said rotor.

* * * * *